April 9, 1963

S. E. WESTMAN 3,084,551

TRANSDUCER WITH LINEARIZED READOUT

Filed Aug. 3, 1959

INVENTOR:
SYDNEY E. WESTMAN,
BY
Attorney.

United States Patent Office 3,084,551
Patented Apr. 9, 1963

3,084,551
TRANSDUCER WITH LINEARIZED READOUT
Sydney E. Westman, Inglewood, Calif., assignor to The Garrett Corporation, Los Angeles, Calif., a corporation of California
Filed Aug. 3, 1959, Ser. No. 831,383
17 Claims. (Cl. 73—410)

This invention relates to a condition responsive transducer and has for its object the provision of improved, accurate means for linearizing or otherwise correcting the transducer readout.

In condition responsive instruments such as those responsive to barometric or static pressure, it is often desired to secure a readout which is linear with respect to log pressure or to altitude and it is known to effect such linearizing by series cam mechanisms and cam gears. Such linearizing devices, however, have limitations from the standpoints of degree of accuracy, torque output, and cost.

According to the present invention, the linearized readout is achieved by a suitable cam which contributes only a minor portion of the total output movement and torque load so that the effect of any cam lift errors is lessened in the final corrected readout.

It is therefore a further object of the invention to provide a condition responsive transducer with a linearizing or correcting mechanism supplying only a minor portion of the over-all output of the transducer.

Another object of the invention is a force responsive transducer in accordance with the preceding object in which the direct and correction movements are separately fed to a differential where they are combined to produce the corrected linearized readout.

Another object of the invention is a pressure responsive transducer in accordance with the preceding objects in which an output shaft driven from the transducer in turn drives a correction cam at a greatly reduced speed, with the output shaft and cam outputs being combined to effect a linearized readout.

Another object of the invention is the provision of a force transducer having a linearizing mechanism providing a minor output as compared to the major direct output of the transducer and in which the linearizing mechanism controls a variable force exerted on the transducer to modify its output.

Another object of the invention is a force transducer in accordance with the immediately preceding object in which the linearizing mechanism includes a correcting cam driven from the transducer output at a reduced speed so that the cam controlled modification constitutes only a minor part of the total transducer readout.

Figure 1:
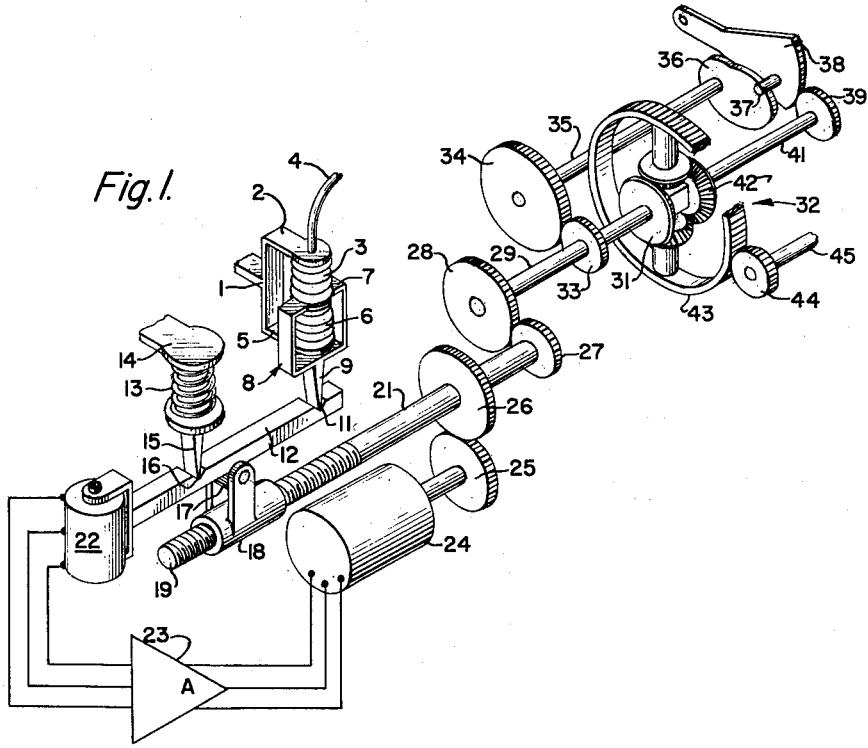
Figure 2:
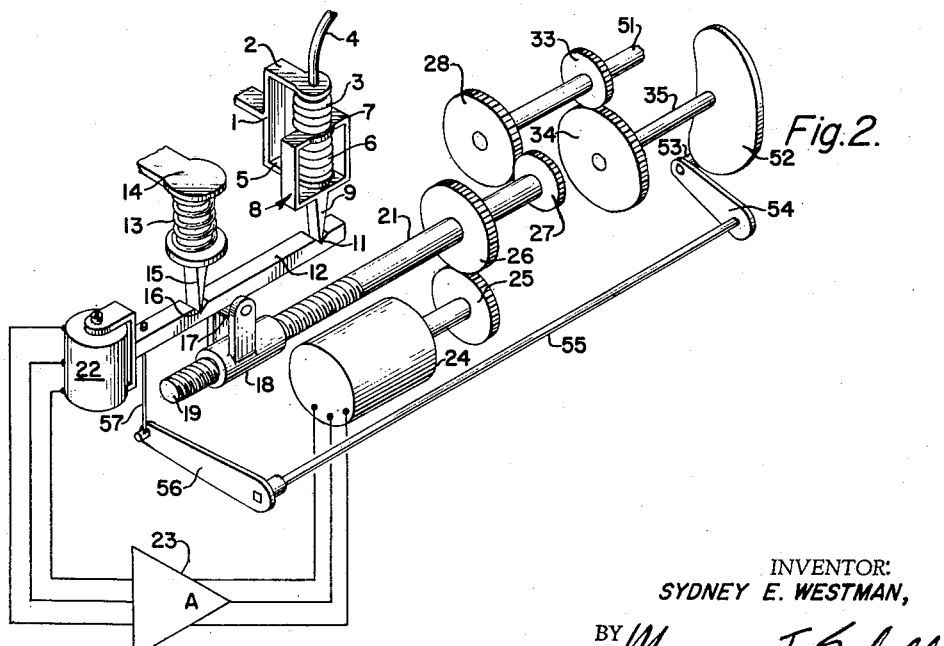

Other objects and features of the invention will be readily apparent to those skilled in the art from the specification and appended drawing illustrating certain preferred embodiments in which:

FIG. 1 is a schematic representation of a pressure responsive transducer with a correcting and linearizing mechanism according to the present invention in which the transducer and linearizing outputs are fed to a combining differential; and FIG. 2 is a schematic view similar to FIG. 1 but showing a form of the invention in which the linearizing cam controls a variable force exerted on the transducer itself to modify its output.

The specific form of transducer illustrated in the drawings embodies a stationary yoke 1 on whose upper leg 2 is mounted a pressure responsive bellows 3 connected by a tube 4 to the static opening of a Pitot-static tube. On a lower leg 5 of the yoke 1 is mounted an evacuated bellows 6 whose purpose is to compensate for movements which the bellows 3 might otherwise make due to changes in ambient pressure. Between the bellows 3 and 6 is mounted an upper wall 7 of a frame 8 which carries a knife edge 9 received within a suitable seat 11 in a balancing beam 12. Opposing the force exerted on the beam 12 by the bellows 3 is a force exerted by a fixed spring 13 bearing at its upper end against a fixed abutment 14 and pressing at its lower end against a knife edge 15 received within a seat 16 in the beam. The beam 12 is balanced, with the moments of the forces exerted by the bellows 3 and spring 13 in equilibrium, by movement of a fulcrum 17 supported on a nut 18 adapted to be reciprocated by rotation of a jack screw 19 forming one end of a shaft 21.

The end of the beam 12 is provided with an electrical pick-off 22 which supplies no signal when the beam is in equilibrium and which supplies signals opposite in phase in response to movement of the beam upwardly or downwardly as its equilibrium is destroyed by changes in the pressure supplied to the bellows 3. The error signal from the pick-off 22 is fed through an amplifier 23 to a reversing electric motor 24 which rotates the shaft 21 through interengaging gears 25 and 26, rotation of the shaft 21 moving the nut 18 rectilinearly to similarly move the fulcrum 17 to return the beam 12 to its balanced, equilibrium position and the null point of the pick-off 22.

The shaft 21 is connected through gears 27 and 28 to a shaft 29 which is in turn connected to drive one of input gears 31 of a differential 32. Through reduction gearing represented schematically by gears 33 and 34, shaft 29 drives a cam shaft 35 upon which is mounted a cam 36 having a surface configuration appropriate to its linearizing and correcting function. The cam surface is engaged by a follower 37 suitably biased thereagainst as by a spring, not shown. The follower 37 is mounted on a sector 38 meshing with a gear 39 on a shaft 41 driving a second input gear 42 of the differential 32. An output gear 43 of the differential 32 is engaged with a gear 44 mounted on a corrected, linearized readout shaft 45.

The operation of the pressure responsive transducer of the invention should be readily apparent from the description of parts given above. As the instrument moves in altitude the barometric or static pressure fed to the bellows 3 will change to effect an unbalance of the beam 12. This will produce an error signal from the pick-off 22 whose phase will cause motor 24 to rotate shaft 21 in the proper direction to move the fulcrum 17 into a position where the beam 12 is again in balance with the moments of the forces of the spring 13 and bellows 3 in equilibrium and with the pick-off 22 at the null point. Shaft 21 and shaft 29, geared thereto, can be considered primary output shafts of the transducer whose movements are substantially linear with respect to changes in pressure.

Rotation of shaft 29 will, through reduction gearing 33, 34, rotate shaft 35 and cam 36 to effect rotation of sector 38 and shaft 41 to place a correcting and/or linearizing movement into the gear 42 of the differential 32. As stated previously, this movement is minor with respect to the input movement of the gear 31 directly driven from the transducer output shafts because of the gear reduction represented by the gears 33 and 34. The differential of the movements of the input gears 31 and 42 effects a rotation of the output gear 43 of the differential 32 which in turn rotates the readout shaft 45 and, with the proper configuration of the cam 36, effects a rotative movement of the readout shaft which is linear with respect to log pressure or altitude.

For purposes of example only, a selection of relative movements of the direct and corrective shafts which has been found desirable is to have the direct output shaft contribute 92½% and the corrector or linearizer contribute 7½%. As a further example, this could be represented by a direct rotation equal to 39 revolutions of shaft 29 over the range of the instrument, for example 100,000 feet of altitude, and a rotation of correction shaft 41 of 2.9 revolutions over the same range. These figures are given only by way of specific example but they do serve to indicate a practical operative relationship in which the cam lift error would be greatly diluted by the fact that the cam handles only a small portion of the total output of the torque and movement of the instrument readout.

In the arrangement of FIG. 2 like parts have been given the same reference numerals as in FIG. 1 and here a readout shaft 51, driven by gear 28, is connected through the reduction gearing 33, 34 with the shaft 35 upon which a correcting and linearizing cam 52 is mounted. The cam surface of the cam 52 is engaged by a follower 53 mounted on an arm 54 connected to a torsion wire or bar 55 to whose other end is connected an arm 56 in turn connected by a link 57 to load the beam 12. In the operation of the arrangement of FIG. 2, the linearizing correction is applied through the force exerted by the torsion wire 55 loading the beam 12 and, with the proper configuration of the cam surface of the cam 52, the resulting readout from shaft 51 will again be linear with respect to log pressure or altitude.

In this arrangement it is seen that all of the torque supplied to the readout shaft 51 is supplied directly by the transducer from its servo motor 24 by the gearing connections to and from its primary output shaft 21. The only torque necessary for the cam 52 to exert is the very minor torque required to stress the torsion wire 55 to secure the desired corrective loading on the beam 12. Also in this arrangement it is seen that the effects of the errors of the cam 52 are similarly diluted in the total output since the movement of the cam 52 is minor compared to the direct drive movement of the readout shaft 51. Any errors in the cam lift do not occur in the direct chain of the readout operation but form only a minor and indirect portion thereof since they are represented only in the corrective force applied through the torsion wire 55. The principal movements of the readout shaft 51 are effected by the relatively large rotative movements of the output shaft 21 resulting from the pressure changes within the bellows 3 which, of course, greatly exceed the minor corrective loading forces on the beam exerted through the torsion wire 55.

While certain preferred embodiments of the invention have been specifically disclosed, it is understood that the invention is not limited thereto, as many variations will be readily apparent to those skilled in the art and the invention is to be given its broadest possible interpretation consistent with the prior art.

What is claimed is:

1. In a pressure transducer: pressure responsive means, means providing an output in accordance with the response of said pressure responsible means to a pressure signal, a correction cam, means driving said correction cam at a reduced rate from said output means, readout means primarily driven by said output means, and means modifying the movement of said readout means in accordance with the movement of said correction cam, said modifying means lessening the normal effect of cam lift errors by the inverse proportion by which the cam lift enters the total readout.

2. In a pressure transducer: pressure responsive means, means providing an output in accordance with the response of said pressure responsive means to a pressure signal, a correction cam, means driving said correction cam at a reduced rate from said output means, differential means having a pair of inputs and a combined output providing a corrected readout for the transducer, means feeding one of said differential inputs from said output means, and means feeding the other of said differential inputs from said correction cam.

3. In a pressure transducer: pressure responsive means, means providing an output in accordance with the response of said pressure responsive means to a pressure signal, correction means, means driving said correction means at a reduced rate from said output means, readout means driven by said output means, and means modifying the response of said pressure responsive means in accordance with the movement of said correction means, said modifying means lessening the normal effect of errors in said correction means by the inverse proportion by which the correction means enters the total readout.

4. In a pressure transducer: pressure responsive means, means providing an output in accordance with the response of said pressure responsive means to a pressure signal, a correction cam, means driving said correction cam at a reduced rate from said output means, readout means driven by said output means, and means modifying the response of said pressure responsive means in accordance with the movement of said correction cam, said modifying means lessening the normal effect of cam lift errors by the inverse proportion by which the cam lift enters the total readout.

5. In a force transducer: condition responsive force means, principal spring means opposing said force means, means providing an output in accordance with the response of said force means to a variation in the condition, readout means, means driving said readout means from said output means, correction means, means driving said correction means from said output means at a rate substantially less than said readout means, auxiliary spring means co-operating with said principal spring means, and means varying said auxiliary spring means in accordance with the position of said correction means to modify the response of said condition responsive means and attain a corrected readout.

6. In a force transducer: condition responsive force means, principal spring means opposing said force means, means providing an output in accordance with the response of said force means to a variation in the condition, readout means, means driving said readout means from said output means, correction means, means driving said correction means at a reduced rate from said output means, auxiliary spring means co-operating with said principal spring means and varying in accordance with the position of said correction means to modify the response of said pressure responsive means, the effect of errors in the correction means on the corrected readout being lessened by the relation between the movements of said readout means and correction means.

7. In a force-balance instrument: a balance beam, condition responsive means applying a force to said beam, means applying a balancing force to said beam, a pick-off for said beam having a null point when the beam is in equilibrium and giving signals of opposite phase when the beam is unbalanced in opposite directions, means responsive to said signals for restoring the beam balance, readout means primarily driven by said restoring means, correction means driven by said restoring means at a rate substantially reduced from that of said readout means, and means modifying the movement of said readout means in accordance with the movement of said correction means.

8. In a force-balance instrument: a balance beam having a movable fulcrum, condition responsive means applying a force to said beam at one side of said fulcrum, means applying a force to said beam at the opposite side of said fulcrum, a pick-off for said beam having a null point when the beam is in equilibrium and giving signals of opposite phase when the beam is unbalanced in opposite directions, restoring means responsive to said signals for moving said fulcrum to restore the beam balance, readout means primarily driven by said restoring means, correction means driven by said restoring means at a rate substantially reduced from that of said readout means, and means modifying the movement of said readout means in accordaance with the movement of said correction means.

9. In a force-balance instrument: a balance beam having a movable fulcrum, condition responsive means applying a force to said beam at one side of said fulcrum, means applying a force to said beam at the opposite side of said fulcrum, a pick-off for said beam having a null point when the beam is in equilibrium and giving signals of opposite phase when the beam is unbalanced in opposite directions, restoring means responsive to said signals for moving said fulcrum to restore the beam balance, readout means primarily driven by said restoring means, a correction cam driven by said restoring means at a rate substantially less than said readout means, and means modifying the movement of said readout means in accordance with the movement of said correction cam to secure a final corrected readout.

10. In a force-balance instrument: a balance beam having a movable fulcrum, condition responsive means applying a force to said beam at one side of said fulcrum, means applying a force to said beam at the opposite side of said fulcrum, a pick-off for said beam having a null point when the beam is in equilibrium and giving signals of opposite phase when the beam is unbalanced in opposite directions, restoring means responsive to said signals for moving said fulcrum to restore the beam balance, readout means primarily driven by said restoring means, correction means driven by said restoring means at a reduced rate, and means modifying the movement of said readout means in accordance with the movement of said correction means whereby the effect of errors in the correction means is lessened in inverse proportion to the extent by which the correction means enters the total readout.

11. In a force-balance instrument: a balance beam having a movable fulcrum, condition responsive means applying a force to said beam at one side of said fulcrum, means applying a force to said beam at the opposite side of said fulcrum, a pick-off for said beam having a null point when the beam is in equilibrium and giving signals of opposite phase when the beam is unbalanced in opposite directions, restoring means responsive to said signals for moving said fulcrum to restore the beam balance, an output shaft driven by said restoring means, a correction cam driven by said restoring means at a rate substantially less than said output shaft, a readout shaft primarily driven by said output shaft, and means modifying the movement of said readout shaft in accordance with the movement of said correction cam whereby the effect of cam lift errors is lessened in inverse relation to the extent by which the cam lift enters the total movement of the readout shaft.

12. In a force-balance instrument: a balance beam having a movable fulcrum, condition responsive means applying a force to said beam at one side of said fulcrum, means applying a force to said beam at the opposite side of said fulcrum, a pick-off for said beam having a null point when the beam is in equilibrium and giving signals of opposite phase when the beam is unbalanced in opposite directions, restoring means responsive to said signals for moving said fulcrum to restore the beam balance, an output shaft driven by said restoring means, correction means driven by said restoring means at a rate substantially reduced from said output shaft, differential means providing a corrected readout, and means feeding the movements of both said output shaft and correction means into said differential means.

13. In a force-balance instrument: a balance beam having a movable fulcrum, condition responsive means applying a force to said beam at one side of said fulcrum, means applying a force to said beam at the opposite side of said fulcrum, a pick-off for said beam having a null point when the beam is in equilibrium and giving signals of opposite phase when the beam is unbalanced in opposite directions, restoring means responsive to said signals for moving said fulcrum to restore the beam balance, means providing an output in accordance with the movement of said restoring means, correction means, means driving said correction means at a reduced rate from said output means, differential means having a pair of inputs and a combined output providing a corrected readout for the instrument, means feeding one of said differential inputs from said output means, and means feeding the other of said differential inputs from said correction means.

14. In a force-balance instrument: a balance beam having a movable fulcrum, condition responsive means applying a force to said beam at one side of said fulcrum, means applying a force to said beam at the opposite side of said fulcrum, a pick-off for said beam having a null point when the beam is in equilibrium and giving signals of opposite phase when the beam is unbalanced in opposite directions, restoring means responsive to said signals for moving said fulcrum to restore the beam balance, output means driven by said restoring means, a correction cam, means driving said correction cam from said restoring means at a rate substantially less than said output means, differential means having a pair of inputs and a combined output providing a corrected readout for the instrument, means feeding one of said differential inputs from said output means, and means feeding the other of said differential inputs from said correction cam.

15. In a force-balance instrument: a balance beam having a movable fulcrum, condition responsive means applying a force to said beam at one side of said fulcrum, means applying a force to said beam at the opposite side of said fulcrum, a pick-off for said beam having a null point when the beam is in equilibrium and giving signals of opposite phase when the beam is unbalanced in opposite directions, restoring means responsive to said signals for moving said fulcrum to restore the beam balance, output means driven by said restoring means, correction means driven by said restoring means at a rate substantially reduced from said output means, readout means driven by said output means, and means controlled by said correction means applying a force to said beam to modify the balance position of said fulcrum in accordance with the position of said correction means.

16. In a force-balance instrument: a balance beam having a movable fulcrum, condition responsive means applying a force to said beam at one side of said fulcrum, means applying a force to said beam at the opposite side of said fulcrum, a pick-off for said beam having a null point when the beam is in equilibrium and giving signals of opposite phase when the beam is unbalanced in opposite directions, restoring means responsive to said signals for moving said fulcrum to restore the beam balance, output means driven by said restoring means, a correction cam driven by said restoring means at a rate substantially less than said output mens, readout means driven by said output means, and spring means controlled by said correction cam for applying a force moment to said beam to modify the balance position of the fulcrum in accordance with the position of said correction cam.

17. In a force-balance instrument: a balance beam having a movable fulcrum, condition responsive means applying a force to said beam at one side of said fulcrum, means applying a force to said beam at the opposite side of said fulcrum, a pick-off for said beam having a null point when the beam is in equilibrium and giving signals of opposite phase when the beam is unbalanced in opposite directions, restoring means responsive to said signals for moving said fulcrum to restore the beam balance, output means driven by said restoring means, a correction cam driven by said restoring means at a rate substantially less than said output means, readout means driven by said output means, and spring means controlled by said correction cam for applying a force moment to said beam to modify the balance position of the fulcrum in accordance with the position of said correction cam, said last-mentioned spring means including a torsion element stressed in accordance with variation in the cam lift.

References Cited in the file of this patent

UNITED STATES PATENTS

| | | |
|---|---|---|
| 2,557,092 | Garbarini | June 19, 1951 |
| 2,729,780 | Miller et al. | Jan. 3, 1956 |
| 2,731,831 | Schaefer | Jan. 24, 1956 |